United States Patent [19]
Koreski

[11] Patent Number: 4,799,641
[45] Date of Patent: Jan. 24, 1989

[54] ANCHOR DEVICE FOR HOLDING HOSES AGAINST RETRACTING SLIDABLE MOVEMENT

[76] Inventor: Martin J. Koreski, P.O. Box 370, Goldendale, Wash. 98620

[21] Appl. No.: 153,950

[22] Filed: Feb. 9, 1988

[51] Int. Cl.⁴ .................................................. F16L 3/22
[52] U.S. Cl. ................................ 248/68.1; 248/74.4; 24/329
[58] Field of Search ............... 24/351, 354, 355, 329; 248/68.1, 74.4, 74.5; 15/320, 321

[56] References Cited

U.S. PATENT DOCUMENTS

| | | | |
|---|---|---|---|
| 1,236,946 | 8/1917 | Kress, Jr. | 24/355 |
| 2,404,531 | 7/1946 | Robertson | 248/68.1 |
| 2,550,001 | 4/1951 | Button | 248/74.4 |
| 2,889,602 | 6/1959 | Maniaci | 248/68.1 |
| 2,890,848 | 6/1959 | Johnson, Jr. | 248/74.4 |
| 3,473,770 | 10/1969 | Edgerton | 24/351 |
| 3,599,915 | 8/1971 | Soltysik | 248/68.1 |
| 3,861,015 | 1/1975 | Hooven | 24/351 |
| 3,894,706 | 7/1975 | Mizusawa | 248/68.1 |
| 4,337,934 | 7/1982 | Caveney | 248/68.1 |
| 4,669,422 | 6/1987 | Steudler, Jr. | 248/68.1 |

*Primary Examiner*—Victor N. Sakran
*Attorney, Agent, or Firm*—Eugene M. Eckelman

[57] ABSTRACT

A flat base member is arranged to seat on a carpeted floor and has a top clamp plate arranged to releasably clamp various hoses therein. The base member has one or more prongs pivotally supported thereon and arranged to slide freely over the carpet in forward movement of the base member but to stick into the carpet in rearward movement of the base member for anchoring the latter against rearward movement.

3 Claims, 1 Drawing Sheet

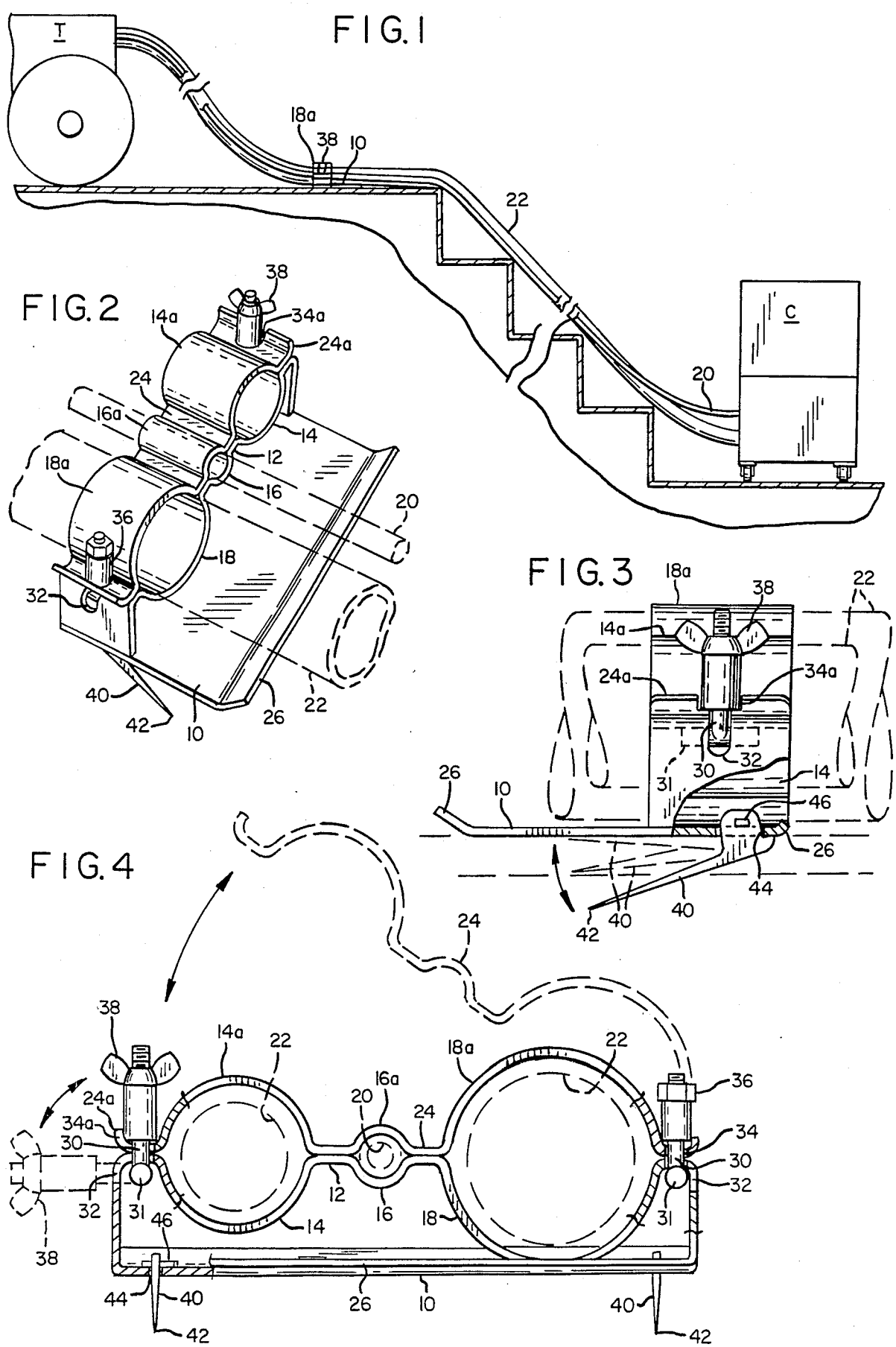

ANCHOR DEVICE FOR HOLDING HOSES AGAINST RETRACTING SLIDABLE MOVEMENT

BACKGROUND OF THE INVENTION

This invention relates to a new and novel anchor device for holding hoses against retracting slidable movement.

Truck mounted cleaning equipment frequently uses long hoses to reach from power equipment in a vehicle to various rooms in a dwelling or other building. The hose must at times be pulled up steps in order to reach rooms in multiple story dwellings. In such cases, a rather heavy retracting pull exists on the hoses, making it difficult for the operator to handle the cleaning head.

SUMMARY OF THE INVENTION

According to the present invention and forming a primary objective thereof, an anchor device is provided which relieves the operator from pulling forces existing on the power machine side of the hoses.

A more particular object of the invention is to provide an anchor device of the type described which clamps onto the cleaning hoses and which includes bottom prong means arranged to stick into a carpeted surface to prevent retracting slidable movement.

In carrying out the objectives of the invention, the device comprises a base member having clamp means on its upper portion arranged to be releasably secured to cleaning hoses. Prong means are provided on the base member and project downwardly for sticking into a carpeted surface for anchoring the base member against retracting slidable movement. The prong means are pivotally supported on the base member and are arranged to rotate upwardly for disengagement from the carpet surface during forward sliding movement of the base member but otherwise to rotate downwardly by gravity to a carpet engaging position to prevent retracting slidable movement. The device has clamp means for a pressure hose and one or more suction hoses and has a structural arrangement arranged to receive suction hoses of different sizes.

The invention will be better understood and additional objects and advantages will become apparent from the following description taken in connection with the accompanying drawings.

BRIEF DESCRIPTION OF THE DRAWINGS

FIG. 1 is a side elevational view of the present device in use for holding a hose against retracting movement on a stairway;

FIG. 2 is a rear perspective view of the device;

FIG. 3 is a side elevational view thereof; and

FIG. 4 is a front elevational view and showing an open position in broken lines.

DETAILED DESCRIPTION OF A PREFERRED EMBODIMENT

The present device has particular use and is described herein in conjunction with anchoring cleaning hoses against retracting slidable movement, but it is to be understood that such device can be used in connection with any process which uses hoses and wherein it is desired that the hoses be anchored against rearward retracting slidable movement.

The device includes a rigid flat base plate or member 10 having a cross wall 12 secured integrally thereto in spaced parallel relation. Wall 12 has a plurality of hose receiving recesses 14, 16, and 18. Center recess 16 is arranged to receive a pressure hose 20 and the recesses 14 and 18 are arranged to receive suction hoses 22. In a preferred construction, recesses 14 and 18 are of different radii which conform approximately to the size of suction hoses used with existing power cleaning equipment. Two sizes of recesses will accommodate most hose sizes currently in use by portable powered cleaning units C arranged for operating a cleaning tool T at distant locations.

The hoses are releasably held in the respective recesses by a top clamp plate 24 having inverted recess portions 14a, 16a, and 18a corresponding in diameter to the lower recess portions 14, 16 and 18, repectively. The hose receiving recesses are of selected radii such for example of slightly smaller size than the hoses whereby with the closure plate 24 in a down or closed position, the plate securely engages the hoses and locks them non-slidably to the anchor device. Base plate 10 has turned up ski ends 26 at the forward and rearward edges.

In a preferred construction, the clamp plate 24 has pivotal connection to the cross wall 12 on one side and a releasable connection to this wall on the other side. The pivotal connection comprises an upright pin 30 passing freely through apertures 32 and 34 in the cross wall 12 and clamp plate 24, respectively. The bottom end of pivot pin 30 has a head 31 extending across the aperture 32 and this latter aperture is extended outwardly in the wall 12 to allow the pin to pivot laterally when the clamp plate is lifted from the other side. The upper end of pin 30 has a nut and sleeve assembly 36 threadedly mounted thereon arranged to clamp this one end of the clamp plate down on the wall 12 or to be released to allow pivot movement of this wall.

The releasable connection is similar to the pivot connection except it has a wing nut and sleeve assembly 38 on a pin 30 and also the aperture 34a in the clamp plate 24 opens upwardly through a turned up edge portion 24a at this side of the clamp plate. Thus when it is desired to install a hose in or remove it from one of the recesses, the wing nut and sleeve assembly 38 is released to the extent that the bottom thereof will clear the top edge of the turned up portion 24a whereby the associated pin can be pivoted laterally out of engagement with this end of the clamp plate 24, as shown in broken lines in FIG. 4. The clamp plate can then be pivoted to an open position, also as shown in broken lines in FIG. 4, with the pivot pin 30 on the other side serving as a hinge. Threaded support of the nut assembly 36 allows it to be adjusted up or down to conform to hoses sizes. If desired, the entire top closure plate 24 can be removed by releasing both sides.

The device utilizes one or more prongs 40 which project from the bottom and which have a sharpened end 42 arranged to stick into a carpeted surface and anchor the device against retracting slidable movement. The connected ends of prongs 40 projects through apertures 44 in the base plate 10 and have pivotal connection to the base plate by cross pins 46. The pivot support of the prongs comprises a free pivot connection whereby the prongs will normally fall downwardly by gravity, as shown in full lines in FIG. 3, to engage a carpeted surface when retracting forces act on the base plate but they will release and move up toward or against the bottom of the base plate in disengaged relation when the base plate is pulled forwardly, as shown in broken lines in FIG. 3.

In the use of the present anchor device, it is secured to a pressure hose 20 and one or more suction hoses, these hoses being clamped into the appropriate recesses 14, 16 or 18. Clamping of the device on the hoses is also made at the appropriate place, namely, the working end of the hoses being predetermined in length to provide the necessary maneuverability and the anchor device located on a carpeted surface whereby to take any retracting pulling forces of gravity or pressure, thus relieving the operator of any of such pulling forces. The device can be pulled forwardly by the operator but will automatically catch in the reverse direction. In general, the device can be used in any situation wherein the operator is relieved of pulling forces on the hoses or the like that are being maneuvered.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. An anchor device for holding hoses against retracting slidable movement comprising:
    a base member having forward and rearward ends and a bottom surface arranged to support said base member slidably on a carpeted surface,
    clamp means on the upper portion of said base member arranged to be releasably secured to a hose intermediate the ends of the latter,
    and bottom prong means on said base member allowing said base member to slide forwardly on a carpeted surface but anchoring said base member and hose clamped therein against a retracting slidable movement on the carpet surface.

2. An anchor device for holding hoses against retracting slidable movement comprising:
    a base member having forward and rearward ends and a bottom surface arranged to support said base member on a carpeted surface,
    clamp means on the upper portion of said base member arranged to be releasably secured to a hose intermediate the ends of the latter,
    and prong means on said base member having a bottom projecting relation arranged to engage a carpeted surface for anchoring said base member and hose clamped therein against a retracting slidable movement,
    said prong means being pivotally supported on said base member and being arranged to rotate upwardly for disengagement from a carpet surface during forward sliding movement of said base member but otherwise to rotate downwardly by gravity to a carpet engaging position to prevent retracting sliding movement of said base member.

3. The anchor device of claim 2 wherein said prong means have forward and rearward ends and have their pivotal support on their said forward end to provide automatic disengaging and engaging functions.

* * * * *